UNITED STATES PATENT OFFICE.

JUNIUS SCHENCK, OF BROOKLYN, NEW YORK.

IMPROVEMENT IN PACKINGS FOR PISTONS, CYLINDERS, VALVES, &c.

Specification forming part of Letters Patent No. 118,394, dated August 22, 1871.

*To all whom it may concern:*

Be it known that I, JUNIUS SCHENCK, of Brooklyn, in the county of Kings and State of New York, have made a new and useful Improvement in Material for Packing Pistons, Cylinders, Valves, Steam-Chests, Pumps, and the like; and I hereby declare the following to be a full and exact description of the same.

Material for packing has been made by rolling a rubber-coated fabric around a core, or so as to form a tube. My invention relates to this kind of packing; and the invention consists in using what is known as asbestus cloth as the fabric for forming the packing. It may be formed either as a tube of square or circular cross-section, or with a square or circular core, which may be of strips of asbestus cloth or a roll of asbestus, or of any other suitable flexible material. The rubber or gutta-percha used in coating the fabric, besides being mixed with sulphur in the usual manner, may be combined with clay, silex, asbestus powder, soap-stone, plaster, magnesia, kaolin earths, metallic oxides, or any of the substances now used for rendering rubber better able to resist the action of steam. The methods of combining such materials with rubber so as to form steam-gum, being well known to manufacturers, need not be further described.

The following description will enable any one skilled in the art to make and use my invention.

I take asbestus cloth and coat it in the usual manner with a vulcanizable compound. When it is required to form a packing with a core, it is prepared of asbestus fiber or other material, and then the coated asbestus cloth rolled around it until the required thickness is attained. It is then vulcanized and finished in the usual manner, or the core may be omitted and the fabric rolled to form a tube. Instead of a round a square core may be used, and by pressing the newly-formed packing in a square mold it may be formed of a square exterior, which for some purposes is preferable.

For forming flat packing I unite two or more sheets of the coated asbestus cloth and vulcanize in the usual way. Or a tube of the proper size may be formed and then pressed so as to collapse the sides. This will form a belt of packing material which may be cut to fit any chamber requring packing.

The packing formed according to this invention is sufficiently elastic without the necessity of an elastic core, such as has been used heretofore. The asbestus cloth is not injured by any degree of heat which would not destroy the other materials. It is a poor conductor of heat, and thus protects the metallic surfaces to which it is applied.

When a core is used it need not be elastic, but must be flexible.

The term "asbestus cloth" is intended to embrace asbestus felt, asbestus paper, and any fabric composed largely or wholly of fibrous asbestus.

Having thus described my invention, what I claim, and desire to secure by Letters Patent of the United States, is—

A packing for stuffing-boxes, pistons, and the like, composed of asbestus cloth and a vulcanizable gum, combined and united so as to form a material substantially such as herein specified.

JUNIUS SCHENCK.

Witnesses:
    M. HOWE, Jr.,
    JOHN MURPHY.